United States Patent [19]

Malone

[11] 4,216,643
[45] Aug. 12, 1980

[54] GUARD MEANS FOR ROTARY MOWERS

[76] Inventor: James P. Malone, 1 Odell Ct., Syosset, N.Y. 11791

[21] Appl. No.: 19,715

[22] Filed: Mar. 12, 1979

Related U.S. Application Data

[63] Continuation of Ser. No. 827,847, Aug. 26, 1977, abandoned.

[51] Int. Cl.² ............................................. A01D 75/20
[52] U.S. Cl. .................................... 56/320.1; 56/17.4; 56/255
[58] Field of Search .................... 56/255, 320.2, 17.4, 56/320.1

[56] References Cited

U.S. PATENT DOCUMENTS

| | | | |
|---|---|---|---|
| 1,954,579 | 4/1934 | Smith | 56/255 |
| 2,514,407 | 7/1950 | May | 56/17.5 |
| 2,779,147 | 1/1957 | Musgrave | 56/255 |
| 2,982,079 | 5/1961 | Schesser | 56/17.4 |
| 3,385,041 | 5/1968 | Douglas | 56/255 |
| 3,391,524 | 7/1968 | Nickoluff et al. | 56/320.2 |
| 3,501,902 | 3/1970 | Dahl et al. | 56/17.4 |
| 3,555,793 | 1/1971 | Clapman | 56/17.4 |
| 3,759,023 | 9/1973 | Comer | 56/320.2 |
| 3,927,513 | 12/1975 | Ramaker et al. | 56/17.4 |
| 4,047,367 | 9/1977 | Thorud | 56/320.2 |

*Primary Examiner*—Paul J. Hirsch
*Attorney, Agent, or Firm*—James P. Malone

[57] ABSTRACT

Guard means for a rotary power mower of the type having a hollow base member, a horizontal blade rotatably mounted in the base member, the base member being adjustably elevated off the ground by a plurality of adjustable wheels. Guards are provided to prevent a person's foot from extending under the base member into contact with the blade. The guards are mounted around the periphery of the base member. The guards extend to close proximity with the ground.

1 Claim, 6 Drawing Figures

GUARD MEANS FOR ROTARY MOWERS

This is a continuation, of application Ser. No. 827,847, filed Aug. 26, 1977, now abandoned.

This invention relates to rotary grass mowers and more particularly to guard means for such mowers to protect the feet of the operator or bystanders.

Rotary grass mowers of this type having a rotary horizontal blade are used in great numbers. These machines are quite dangerous and are the source of a great many accidents causing loss of toes, fingers and parts thereof. They are especially dangerous when small children are about.

The accidents are generally caused by a foot of the operator or bystander being run over by the mower so that the foot comes into contact with the rotating blade which is only about one-half inch above the bottom of the side wall of the hollow base member. The wheels on the mower are adjustable in height so that the grass can be cut to an adjustable height. Therefore, the bottom of the base member may be as much as four or more inches off the ground.

Another cause of accidents is the fact that stones, pieces of glass, can be propelled by the blade underneath the side wall of the base member. These objects may be propelled with great velocity and cause damage to persons as much as fifty feet away from the mower.

The present invention solves these problems by providing guard means mounted on the side of the base member. The guard means being adjustable with respect to the base member so that they will always extend close enough to the ground to prevent a foot from extending under the base member and into contact with the blade.

Accordingly, a principal object of the invention is to provide new and improved guard means for rotary mowers.

Another object of the invention is to provide new and improved guard means for rotary mowers comprising an adjustable guard member adapted to extend to close proximity with the ground.

Another object of the invention is to provide new and improved guard means for rotary mowers comprising spring loaded guard members.

These and other objects of the invention will be apparent from the following specification and drawings of which:

Referring to the figures, the rotary mower comprises a hollow base member 1, upon which is mounted a motor 2, which drives the rotating blade 3 for the purpose of cutting the grass. The conventional wheels, 4, 5, etc., of the mower are adjustable by means of adjustment means 4', 5', so that the mower may be adjusted for cutting the grass at a desired height.

The blade 3 is generally about one-half inch above the lower edge 1' of the hollow base member so that if the base is elevated above the ground it is quite possible for a person's foot to fit underneath the hollow base member.

The present invention provides a plurality of guard members 6, 7, 8, 9, 10, etc., which may have various forms. It is important that the guard members be adjustable in height so that they can extend to close proximity to the ground.

Figure 1:
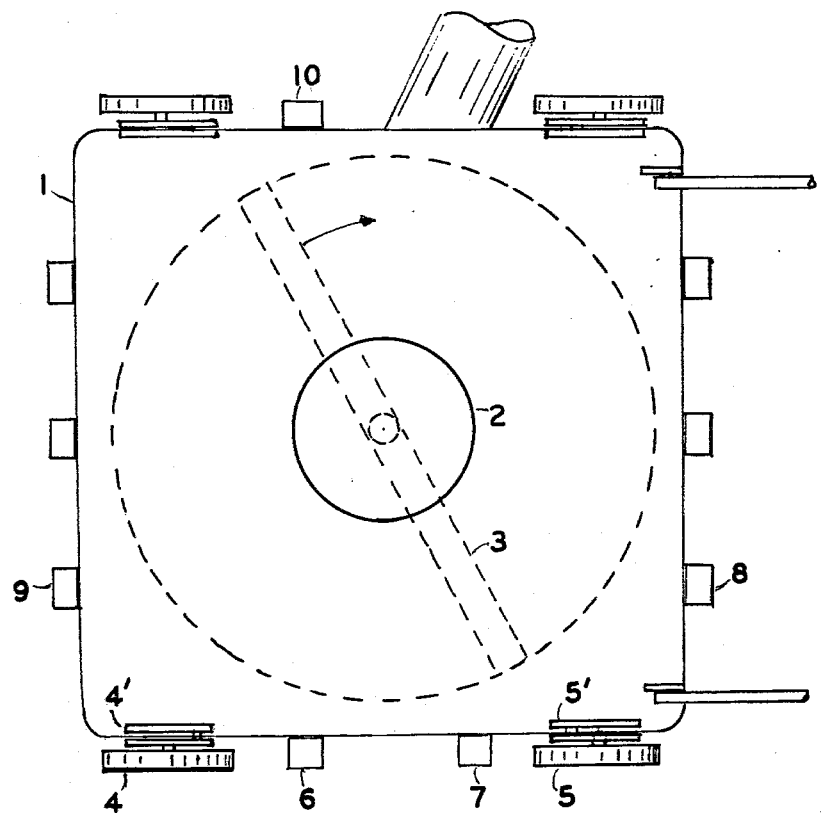
FIG. 1 is a top view of an embodiment of the invention.
Figure 2:
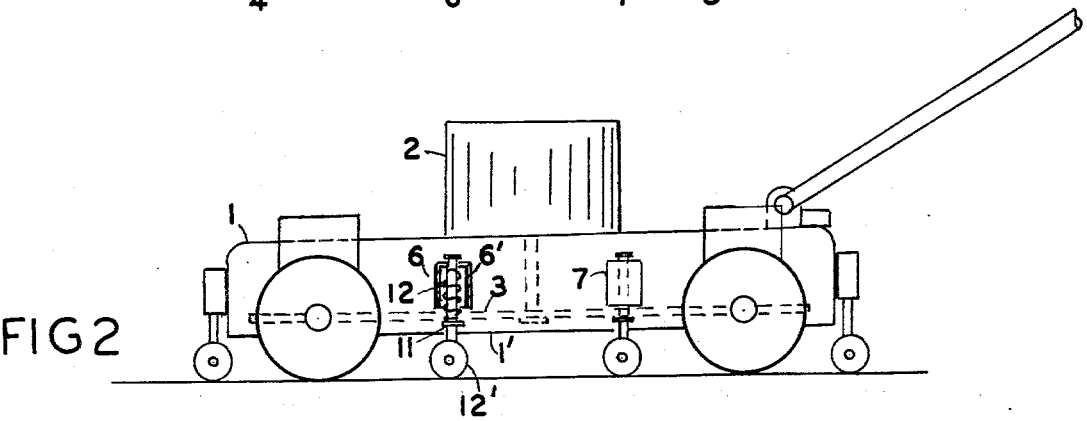
FIG. 2 is a side view of FIG. 1.

In FIG. 2, the guard members comprise a hollow mounting member 6' which is affixed to the side wall of the base. A rod 11 is slidably mounted in the member 6' and is spring loaded down by means of the spring 12. The rod 11 preferably has a wheel 12', which rides on the ground. The guard members are spaced around the periphery of the side wall of the base member every few inches so as to prevent a person's foot from fitting between them.

Figure 3:
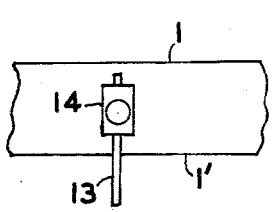
FIGS. 3 and 4 are detail views of modification of the invention.

FIG. 3 shows another embodiment of the invention wherein the guard member is an extending post 13, which is adjustably clamped to the side wall by means of the clamp 14.

Figure 4:
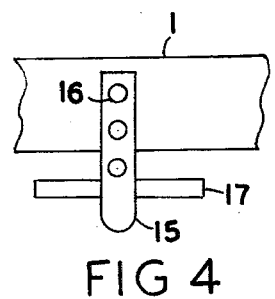

FIG. 4 shows another embodiment of the guard member comprising an elongated member 15 which is adjustably mounted on the side wall 1, by means of bolts or other fasteners 16. In this embodiment a horizontal member 17 is mounted on the vertical member 15.

Figure 5:
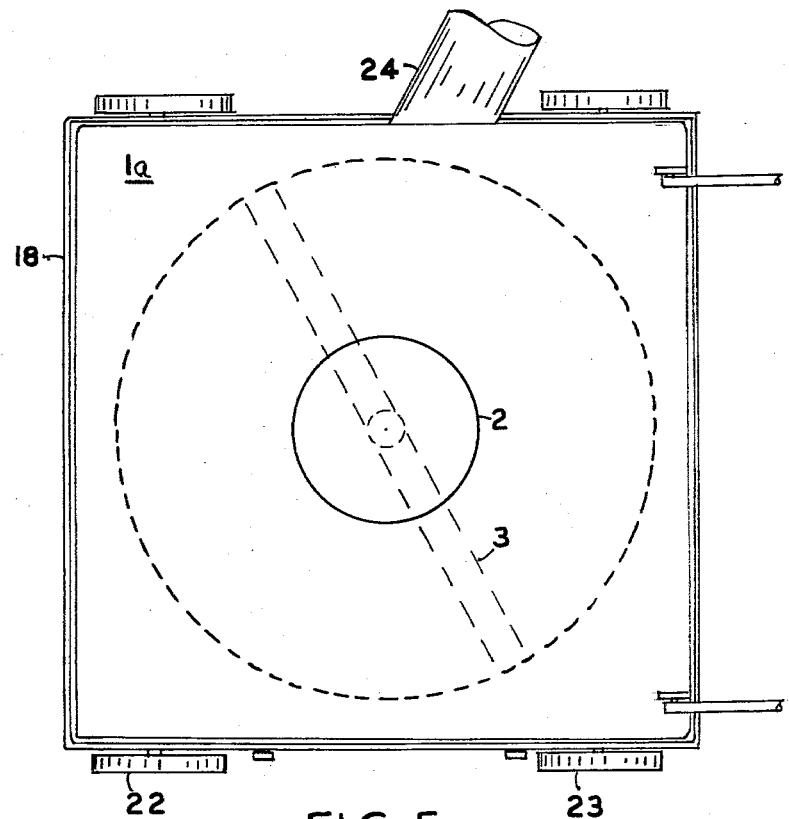
FIG. 5 is a top view of anoher embodiment of the invention.
Figure 6:
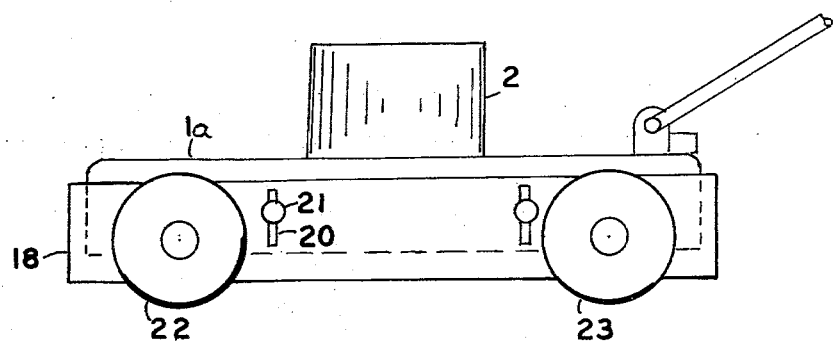
FIG. 6 is a side view of FIG. 5.

FIG. 5 shows a top view of another embodiment of the invention having a hollow base member 1a. In this embodiment the guard member comprises a continuous frame member 18, which extends completely around the base member 1a, and is mounted for vertical adjustment by means of slots 20, so that the wall member 18, can be clamped to the base member 1a, by means of clamping bolts 21. The mower wheels 22, 23, are mounted on the guard wall 18 so that regardless of the height of the blade off the ground the lower edge of the guard frame 18 is always a constant small distance from the ground. This distance would preferably be about one-half inch to protect feet from extending underneath the guard wall and to protect people in the vicinity of being struck by objects propelled by the blade.

The frame 18 has to be apertured to accommodate the grass exit chute 24. The exit chute should be permanently affixed to the base 1 and should extend out at least one foot, to protect persons when a grass collection bag is not attached to the chute.

It is claimed:

1. In a rotary power mower of the type having a hollow base member, a horizontal blade rotatably mounted in the base member, the base member being adjustably elevated off the ground by a plurality of adjustable wheels;
    means to prevent a person's foot from extending under the base member into contact with said blade, comprising guard means mounted on and around the entire periphery of said base member, said guard means extending into close proximity to the ground, comprising:
    a plurality of vertically extending members connected to the base,
    a plurality of ground contacting wheels one connected to each vertically extending member,
    and means connected to the vertically extending members to spring load the ground contacting wheels into contact with the ground as the mower is moved.

* * * * *